United States Patent
Curtis

(10) Patent No.: US 11,605,251 B2
(45) Date of Patent: Mar. 14, 2023

(54) COMPUTE SYSTEM WITH CONTROLLER AREA NETWORK ERROR PROTECTION MECHANISM AND METHOD OF OPERATION THEREOF

(71) Applicant: MOJ.IO, Inc., Vancouver (CA)

(72) Inventor: James Anthony Curtis, Temecula, CA (US)

(73) Assignee: MOJ.IO, Inc., Vancouver (CA)

( * ) Notice: Subject to any disclaimer, the term of this patent is extended or adjusted under 35 U.S.C. 154(b) by 388 days.

(21) Appl. No.: 16/849,338

(22) Filed: Apr. 15, 2020

(65) Prior Publication Data

US 2021/0327167 A1    Oct. 21, 2021

(51) Int. Cl.
| | |
|---|---|
| *G07C 5/08* | (2006.01) |
| *B60R 16/03* | (2006.01) |
| *G01M 17/007* | (2006.01) |
| *H04L 1/00* | (2006.01) |
| *H04L 12/40* | (2006.01) |

(52) U.S. Cl.
CPC ............ *G07C 5/0808* (2013.01); *B60R 16/03* (2013.01); *G01M 17/007* (2013.01); *H04L 1/0061* (2013.01); *B60W 2540/06* (2013.01); *H04L 2012/40215* (2013.01); *H04L 2012/40273* (2013.01)

(58) Field of Classification Search
CPC .... G07C 5/0808; B60R 16/03; G01M 17/007; H04L 1/0061; H04L 2012/40215; H04L 2012/40273; H04L 63/1425; H04L 67/125; B60W 2540/06
See application file for complete search history.

(56) References Cited

U.S. PATENT DOCUMENTS

| | | | |
|---|---|---|---|
| 8,213,321 B2 * | 7/2012 | Butts | .................. H04L 43/0847 370/242 |
| 2017/0093866 A1 * | 3/2017 | Ben-Noon | .......... H04W 12/069 |
| 2018/0060267 A1 | 3/2018 | Sutton et al. | |

FOREIGN PATENT DOCUMENTS

WO      2017127639 A1     7/2017

* cited by examiner

*Primary Examiner* — Michael V Kerrigan
(74) *Attorney, Agent, or Firm* — Perspectives Law Group, Corp.

(57) ABSTRACT

A method of operation of a compute system comprising: operating a controller area network with a first node including a first error counter and a second node including a second error counter; transmitting a message from the first node to the second node over the controller area network; detecting an error by the first node or the second node; incrementing the first error counter or the second error counter based on whichever the first node or the second node that detected the error; and shutting off an on-board diagnostic port when the first error counter or the second error counter reaches a shut-off threshold.

17 Claims, 6 Drawing Sheets

COMPUTE SYSTEM WITH CONTROLLER AREA NETWORK ERROR PROTECTION MECHANISM AND METHOD OF OPERATION THEREOF

TECHNICAL FIELD

An embodiment of the present invention relates generally to a compute system, and more particularly to a system with a controller area network error protection mechanism.

BACKGROUND ART

Modern compute systems, especially transportation systems, are providing increasing levels of functionality to support modern life including additional status monitoring, connectivity services, and diagnostic services. Technology has enabled increased integration of components for vehicles systems to be adjusted, tuned, and enhanced. Research and development in the existing technologies can take a myriad of different directions.

As users become more empowered with the growth of obtaining more intelligence in vehicles, increased anomalies and errors arise. However, in the midst of increased diagnostic and usage information, other challenges arise with vehicles.

Thus, a need still remains for a compute system with a controller area network error protection mechanism. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides a method of operation of a compute system comprising: operating a controller area network with a first node including a first error counter and a second node including a second error counter; transmitting a message from the first node to the second node over the controller area network; detecting an error by the first node or the second node; incrementing the first error counter or the second error counter based on whichever the first node or the second node that detected the error; and shutting off an on-board diagnostic port when the first error counter or the second error counter reached a shut-off threshold.

An embodiment of the present invention provides a compute system, including: a communication unit configured to: operate a controller area network with a first node including a first error counter and a second node including a second error counter; a control circuit, coupled to the communication circuit, configured to: transmit a message from the first node to the second node over the controller area network, detect an error by the first node or the second node, increment the first error counter or the second error counter based on whichever the first node or the second node that detected the error, and shut off an on-board diagnostic port when the first error counter or the second error counter reached a shut-off threshold.

An embodiment of the present invention provides a non-transitory computer readable medium including instructions executable by a control circuit for a compute system, including: operating a controller area network with a first node including a first error counter and a second node including a second error counter; transmitting a message from the first node to the second node over the controller area network; detecting an error by the first node or the second node; incrementing the first error counter or the second error counter based on whichever the first node or the second node that detected the error; and shutting off an on-board diagnostic port when the first error counter or the second error counter reached a shut-off threshold.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
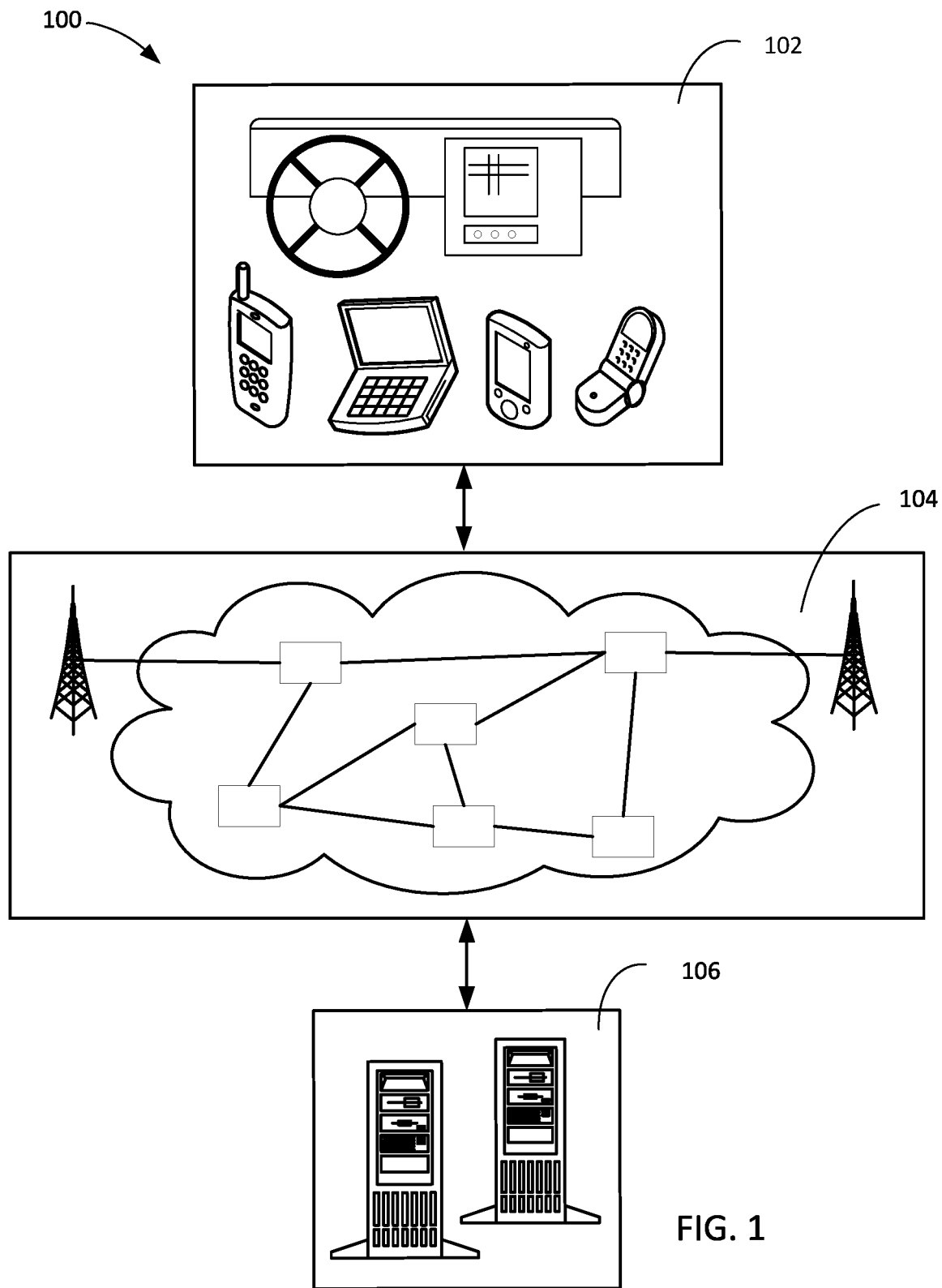
FIG. 1 is a compute system with a controller area network error frame mechanism in an embodiment of the present invention.

Embodiments provide the compute system can minimize the complexity to determine anomalies in a vehicle by detecting the error frame of the controller area network. The correct detection of the error frame of the controller area network provides for the determination of the causes of the anomalies for the compute system.

Embodiments provide the compute system can prevent anomalies to the compute system by processing the controller area network error frames. The correct determination of the controller area network error frames can allow the compute system to prevent anomalies to the vehicle. As an example, the compute system can prevent further interaction with a node that is causing the error frames.

Embodiments provide improvements to the reliability of the compute system by preventing anomalies that are caused by error frames in the controller area network. The controller area network error protection mechanism can shut-off the node that is causing the anomalies.

Embodiments provide the simplified and robust determination of error frames of the controller area network to provide accurate diagnostic information. As an example, compute systems can correctly gather accurate records for the vehicle by preventing the anomalies.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for an embodiment of the present invention. The terms first, second, etc. can be used throughout as part of element names and are used as a matter of descriptive convenience and are not intended to have any other significance or provide limitations for an embodiment.

The term "module" referred to herein can include or be implemented as software, hardware, or a combination thereof in the present invention in accordance with the context in which the term is used. For example, the software can be machine code, firmware, embedded code, and application software. The software can also include a function, a call to a function, a code block, or a combination thereof. Also for example, the hardware can be gates, circuitry, processor, computer, integrated circuit, integrated circuit cores, a pressure sensor, an inertial sensor, a microelectromechanical system (MEMS), passive devices, physical non-transitory memory medium including instructions for performing the software function, a portion therein, or a combination thereof to control one or more of the hardware units or circuits. Further, if a module is written in the apparatus claims section below, the modules are deemed to include hardware circuitry for the purposes and the scope of apparatus claims.

The modules in the following description of the embodiments can be coupled to one other as described or as shown. The coupling can be direct or indirect without or with, respectively, intervening items between coupled items. The coupling can be physical contact or by communication between items.

Referring now to FIG. 1, therein is shown a compute system 100 with a controller area network error protection mechanism in an embodiment of the present invention. The compute system 100 includes a first device 102, such as a client or a server, connected to a second device 106, such as a client or server. The first device 102 can communicate with the second device 106 with a communication path 104, such as a wireless or wired network.

For example, the first device 102 can be of any of a variety of devices, such as a vehicle, a telematics system in a vehicle, a computing device, a cellular phone, a tablet computer, a smart phone, a notebook computer, vehicle embedded navigation system, or computing device. The first device 102 can couple, either directly or indirectly, to the communication path 104 to communicate with the second device 106 or can be a stand-alone device.

The second device 106 can be any of a variety of centralized or decentralized computing devices, sensor devices to take measurements or record environmental information, such as sensor instruments, sensor equipment, or a sensor array. For example, the second device 106 can be a multimedia computer, a laptop computer, a desktop computer, grid-computing resources, a virtualized computer resource, cloud computing resource, routers, switches, peer-to-peer distributed computing devices, an on-board diagnostics dongle, or a combination thereof.

The second device 106 can be mounted externally or internally to a vehicle, centralized in a single room or within a vehicle, distributed across different rooms, distributed across different geographical locations, embedded within a telecommunications network. The second device 106 can couple with the communication path 104 to communicate with the first device 102.

For illustrative purposes, the compute system 100 is described with the second device 106 as a computing device, although it is understood that the second device 106 can be different types of devices, such as a standalone sensor or measurement device. Also for illustrative purposes, the compute system 100 is shown with the second device 106 and the first device 102 as end points of the communication path 104, although it is understood that the compute system 100 can have a different partition between the first device 102, the second device 106, and the communication path 104. For example, the first device 102, the second device 106, or a combination thereof can also function as part of the communication path 104.

The communication path 104 can span and represent a variety of networks and network topologies. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104. Further, the communication path 104 can traverse a number of network topologies and distances. For example, the communication path 104 can include direct connection, personal area network (PAN), local area network (LAN), metropolitan area network (MAN), wide area network (WAN), or a combination thereof.

Figure 2:
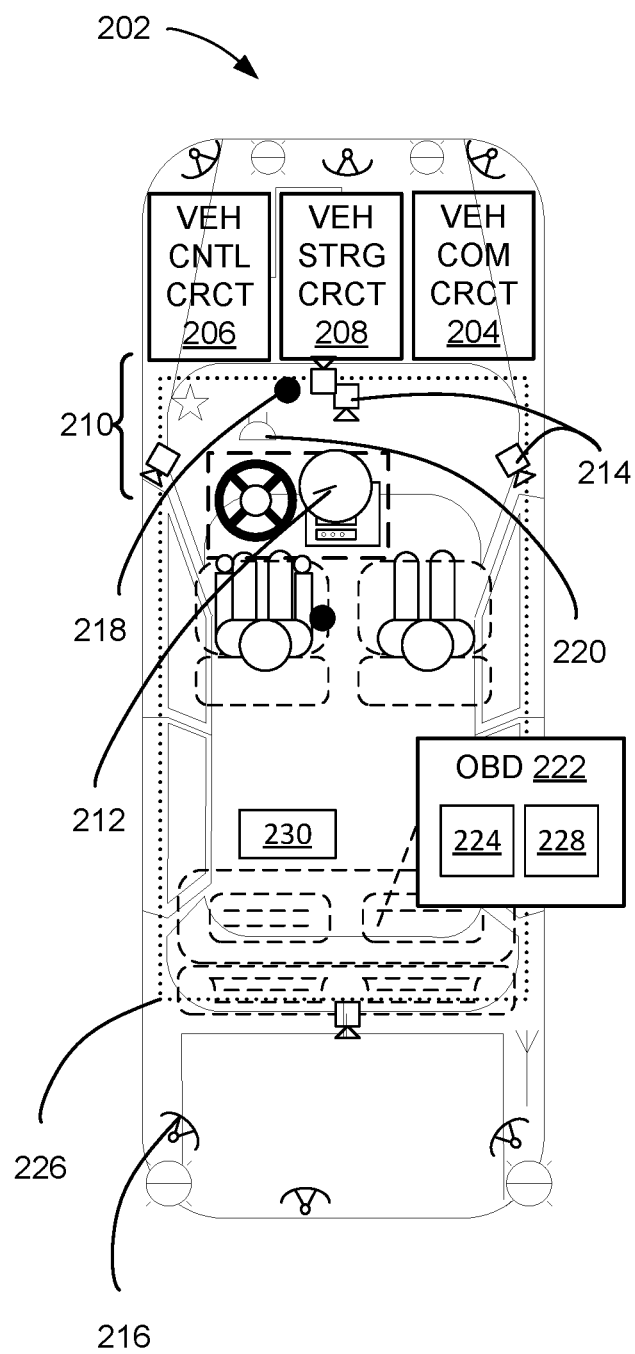
FIG. 2 is an example of a top plan view illustration of a vehicle for the compute system.

Referring now to FIG. 2, therein is shown an example a top plan view of a vehicle 202 for the compute system 100 of FIG. 1. As an example, the compute system 100 can include or interact with the first device 102 of FIG. 1 as the vehicle 202. The vehicle 202 can also include one or more of environmental sensors 210. The vehicle 202 is an object or a machine used for transporting people or goods. The vehicle 202 can also be capable of providing assistance in maneuvering or operating the object or the machine.

The vehicle 202 can include or represent different types of vehicles. For example, the vehicle 202 can be an electric vehicle, a combustion vehicle, or a hybrid vehicle. Also for example, the vehicle 202 can be an autonomous vehicle or non-autonomous vehicle. As a specific example, the vehicle 202 can include a car, a truck, a cart, or a combination thereof.

The vehicle 202 can include a device, a circuit, one or more specific sensors, or a combination thereof for providing assistance or additional information to control, maneuver, or operate the vehicle 202. The vehicle 202 can include a vehicle communication circuit 204, a vehicle control circuit 206, a vehicle storage circuit 208, other interfaces, or a combination thereof.

The vehicle 202 can also include on-board diagnostics 222 (OBD) that can be accessed by the vehicle control circuit 206. As an example, the vehicle control circuit 206 can access the on-board diagnostics 222 with the vehicle communication circuit 204. The vehicle 202 can store and retrieve the on-board diagnostics 222 to and from the vehicle storage circuit 208.

The on-board diagnostics 222 represent information about the vehicle 202. For example, the on-board diagnostics 222 can provide status or the state of the vehicle 202 or a portion thereof. The on-board diagnostics 222 can also represent an ignition status 224. The ignition status 224 represents the current state of ignition. The ignition status 224 can represent whether the engine is on or off. The term "on" refers to the engine that is running. The term "off" refers to the engine that is not running.

The on-board diagnostics 222 can provide information about a battery 230. Although the battery 230 can differ in size, capacity, and type depending on the vehicle 202, the battery 230 provides voltage values that can be read as part of the on-board diagnostics 222.

The on-board diagnostics 222 can be transmitted by a controller area network 226 in the vehicle 202. The controller area network 226 allows communication between the vehicle communication circuit 204, the vehicle control circuit 206, the vehicle storage circuit 208, the on-board diagnostics 222, other interfaces, or a combination thereof. The controller area network 226 can also allow for communication with the environmental sensors 210 with the rest of the vehicle 202.

The on-board diagnostics 222 can be obtained by an external device utilizing the on-board diagnostics port 228. The on-board diagnostics port 228 allows an external device to communicate the vehicle communication circuit 204, the vehicle control circuit 206, the vehicle storage circuit 208, the on-board diagnostics 222, other interfaces, or a combination thereof along the controller area network 226. For example, the on-board diagnostics port 228 can be accessed utilizing an on-board diagnostics dongle.

The vehicle storage circuit 208 can include a functional unit or circuit integral to the vehicle 202 and configured to store and recall information. The vehicle storage circuit 208 can be a volatile memory, a nonvolatile memory, an internal memory, an external memory, or a combination thereof. For example, the vehicle storage circuit 208 can be a nonvolatile storage such as non-volatile random access memory (NVRAM), Flash memory, disk storage, or a volatile storage such as static random access memory (SRAM).

The vehicle storage circuit 208 can store vehicle software, other relevant data, such as input information, information from sensors, processing results, information predetermined or preloaded by the compute system 100 or vehicle manufacturer, or a combination thereof. The vehicle storage circuit 208 can store the information for the on-board diagnostics 222.

The vehicle control circuit 206 can include a function unit or circuit integral to the vehicle 202 and configured to execute or implement instructions. The vehicle control circuit 206 can execute or implement the vehicle software to provide the intelligence of the vehicle 202, the compute system 100, or a combination thereof. The vehicle control circuit 206 can respond to requests for the on-board diagnostics 222. The request can be from other parts of the vehicle 202, the compute system 100, or a combination thereof or external to the compute system 100.

The vehicle control circuit 206 can be implemented in a number of different manners. For example, the vehicle control circuit 206 can be a processor, an application specific integrated circuit (ASIC) an embedded processor, a microprocessor, a hardware control logic, a hardware finite state machine (FSM), a digital signal processor (DSP), or a combination thereof. As a more specific example, the vehicle control circuit 206 can include an engine control unit, one or more central processing unit, or a combination thereof.

The vehicle communication circuit 204 can include a function unit or circuit integral to the vehicle 202 and configured to enable external communication to and from the vehicle 202. For example, the vehicle communication circuit 204 can permit the vehicle 202 to communicate with the first device 102, the second device 106 of FIG. 1, the communication path 104 of FIG. 1, or a combination thereof. The vehicle communication circuit 204 can provide the on-board diagnostics 222 to other portions of the vehicle 202, the compute system 100, or a combination thereof or external to the compute system 100.

The vehicle communication circuit 204 can also function as a communication hub allowing the vehicle 202 to function as part of the communication path 104 and not limited to be an end point or terminal circuit to the communication path 104. The vehicle communication circuit 204 can include active and passive components, such as microelectronics or an antenna, for interaction with the communication path 104. For example, the vehicle communication circuit 204 can include a modem, a transmitter, a receiver, a port, a connector, or a combination thereof for wired communication, wireless communication, or a combination thereof.

The vehicle communication circuit 204 can couple with the communication path 104 to send or receive information directly between the vehicle communication circuit 204 and the first device 102, the second device 106, or a combination thereof as endpoints of the communication, such as for direct line-of-sight communication or peer-to-peer communication. The vehicle communication circuit 204 can further couple with the communication path 104 to send or receive information through a server or another intermediate device in between endpoints of the communication.

The vehicle 202 can further include various interfaces. The vehicle 202 can include one or more interfaces for interaction or internal communication between functional units or circuits of the vehicle 202. For example, the vehicle 202 can include one or more interfaces, such as drivers, firmware, wire connections or buses, protocols, or a combination thereof, for the vehicle storage circuit 208, the vehicle control circuit 206, or a combination thereof.

The vehicle 202 can further include one or more interfaces for interaction with an occupant, an operator or a driver, a passenger, or a combination thereof relative to the vehicle 202. For example, the vehicle 202 can include a user interface including input or output devices or circuits, such as a screen or touch screen, a speaker, a microphone, a keyboard or other input devices, an instrument panel, or a combination thereof.

The vehicle 202 can further include one or more interfaces along with switches or actuators for physically controlling movable components of the vehicle 202. For example, the vehicle 202 can include the one or more interfaces along with the controlling mechanisms to physically perform and control the maneuvering of the vehicle 202, such as for automatic driving or maneuvering features.

The functional units or circuits in the vehicle 202 can work individually and independently of the other functional units or circuits. The vehicle 202 can work individually and independently from the first device 102, the communication path 104, the second device 106, other devices or vehicles, or a combination thereof.

The functional units or circuits described above can be implemented in hardware. For example, one or more of the functional units or circuits can be implemented using the a gate, circuitry, a processor, a computer, integrated circuit, integrated circuit cores, a pressure sensor, an inertial sensor, a microelectromechanical system (MEMS), a passive device, a physical non-transitory memory medium containing instructions for performing the software function, a portion therein, or a combination thereof.

The environmental sensors 210 are each a device for detecting or identifying environment of the vehicle 202. The environmental sensors 210 can detect, identify, determine, or a combination thereof for the vehicle 202 itself, such as for status or movement thereof. The environmental sensors 210 can detect, identify, determine, or a combination thereof for environment within a cabin of the vehicle 202, an environment external to and surrounding the vehicle 202, or a combination thereof.

For example, the environmental sensors 210 can include a location-movement sensor 212, a visual sensor 214, a radar sensor 216, an accessory sensor 218, a volume sensor 220, or a combination thereof. The location-movement sensor 212 can identify or calculate a geographic location of the vehicle 202, determine a movement of the vehicle 202, or a combination thereof. Examples of the location-movement sensor 212 can include an accelerometer, a speedometer, a GPS receiver or device, a gyroscope or a compass, or a combination thereof. The vehicle 202 can include the environmental sensors 210 other than or in addition to the location-movement sensor 212, such as thermal sensor. The thermal sensor can capture and provide temperature readings for portions of the vehicle 202. The thermal sensor can also capture and provide temperature readings external to the vehicle 202.

The visual sensor 214 can include a sensor for detecting or determining visual information representing the environment external to and surrounding the vehicle 202. The visual sensor 214 can include a camera attached to or integral with the vehicle 202. For example, the visual sensor 214 can include a camera, such as forward facing camera, a rear-view or back-up camera, a side-view or a blind-spot camera, or a combination thereof. Also for example, the visual sensor 214 can include an infrared sensor or a night vision sensor.

The visual sensor 214 can further include a camera on the first device 102 connected to and interacting with the vehicle 202. The visual sensor 214 can further include a cabin camera for detecting or determining visual information inside the vehicle or cabin of the vehicle.

The radar sensor 216 can include an object-detection system, device, or circuit. The radar sensor 216 can determine or identify an existence of an object or a target, such as an obstacle or another vehicle, external to the vehicle 202 a relative location or a distance between the object or the target and the vehicle 202, or a combination thereof.

The radar sensor 216 can utilize radio waves to determine or identify an existence of the object or the target, the relative location or a distance from the vehicle 202, or a combination thereof. For example, the radar sensor 216 can include a proximity sensor or warning system, such as for an area in front of, behind, adjacent to or on a side of, or a combination thereof geographically or physically relative to the vehicle 202.

The accessory sensor 218 can include a sensor for determining or detecting a status of a subsystem or a feature of the vehicle 202. The accessory sensor 218 can determine or detect the status or a setting for windshield wipers, turn signals, gear setting, headlights, or a combination thereof.

The volume sensor 220 can include a sensor for detecting or determining sounds for the vehicle 202. The volume sensor 220 can include a microphone for detecting or determining sounds within a cabin of the vehicle 202. The volume sensor 220 can further include a circuit for detecting or determining a volume level or an output level of speakers within the vehicle 202.

The vehicle 202 can use one or more of the environmental sensors 210 to generate the on-board diagnostics 222 describing or representing information regarding the environment within or surrounding the vehicle 202. The on-board diagnostics 222 can be further processed with the vehicle control circuit 206, stored in the vehicle storage circuit 208, communicated to another device through the vehicle control circuit 206, or a combination thereof.

The vehicle 202 can further include a user device or a mobile device illustrated in FIG. 1. For example, the vehicle 202 can include the first device 102. As a further example, the vehicle 202 can include an on-board diagnostics dongle.

As a more specific example, the vehicle communication circuit 204, the vehicle control circuit 206, the vehicle storage circuit 208, the environmental sensors 210, one or more interfaces, or a combination thereof can be included in or make up the first device 102 included in or integral with the vehicle 202. Also as a more specific example, the vehicle 202 can include or be integral with the first device 102 including an embedded computer system, an infotainment system, a smart driving or a driver assistance system, a self-driving or a maneuvering system for the vehicle, or a combination thereof.

Figure 3:
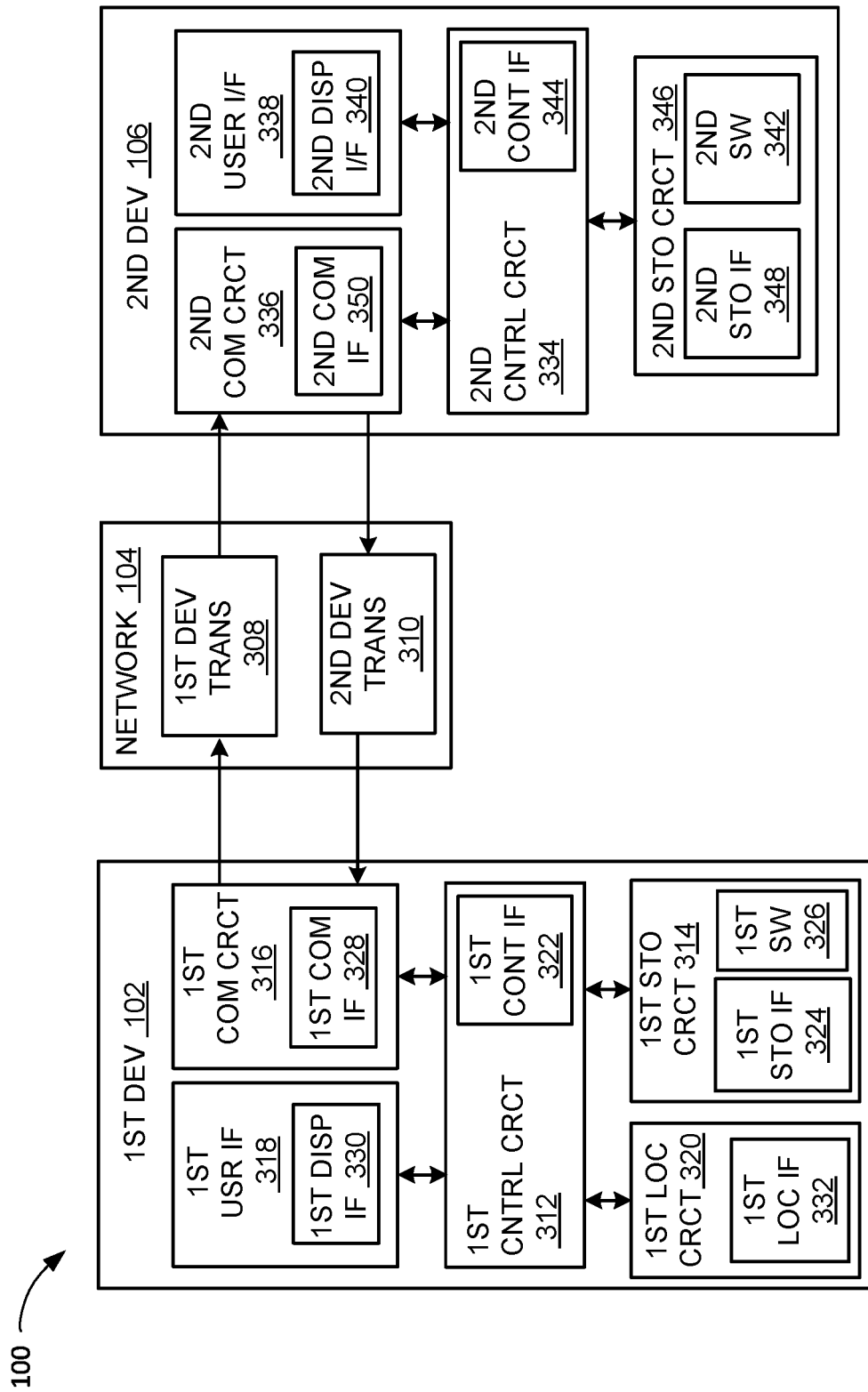
FIG. 3 is an exemplary block diagram of the compute system.

Referring now to FIG. 3, therein is shown an exemplary block diagram of the compute system 100. The compute system 100 can include the first device 102, the communication path 104, and the second device 106. The first device 102 can send information in a first device transmission 308 over the communication path 104 to the second device 106. The second device 106 can send information in a second device transmission 310 over the communication path 104 to the first device 102.

For illustrative purposes, the compute system 100 is shown with the first device 102 as a client device, although it is understood that the compute system 100 can include the first device 102 as a different type of device. For example, the first device 102 can be a server including a display interface.

Also for illustrative purposes, the compute system 100 is shown with the second device 106 as a server, although it is understood that the compute system 100 can include the second device 106 as a different type of device. For example, the second device 106 can be a client device.

Further, for illustrative purposes, the compute system 100 is shown with interaction between the first device 102 and the second device 106, although it is understood that the first device 102 can similarly interact another instance of the first device 102. Similarly, the second device 106 can similarly interact with another instance of the second device 106.

For brevity of description in this embodiment of the present invention, the first device 102 will be described as a client device and the second device 106 will be described as a server device. The embodiment of the present invention is not limited to this selection for the type of devices. The selection is an example of an embodiment of the present invention.

The first device 102 can include a first control circuit 312, a first storage circuit 314, a first communication circuit 316, and a first user interface 318, and a first location circuit 320. The first control circuit 312 can include a first control interface 322. The first control circuit 312 can execute a first software 326 to provide the intelligence of the compute system 100.

The first control circuit 312 can be implemented in a number of different manners. For example, the first control circuit 312 can be a processor, an application specific integrated circuit (ASIC) an embedded processor, a microprocessor, a hardware control logic, a hardware finite state machine (FSM), a digital signal processor (DSP), or a combination thereof. The first control interface 322 can be used for communication between the first control circuit 312 and other functional units or circuits in the first device 102. The first control interface 322 can also be used for communication that is external to the first device 102.

The first control interface 322 can receive information from the other functional units/circuits or from external sources, or can transmit information to the other functional units/circuits or to external destinations. The external sources and the external destinations refer to sources and destinations external to the first device 102.

The first control interface 322 can be implemented in different ways and can include different implementations depending on which functional units/circuits or external units/circuits are being interfaced with the first control interface 322. For example, the first control interface 322 can be implemented with a pressure sensor, an inertial sensor, a microelectromechanical system (MEMS), optical circuitry, waveguides, wireless circuitry, wireline circuitry, or a combination thereof.

The first storage circuit 314 can store the first software 326. The first storage circuit 314 can also store the relevant information, such as data representing incoming images, data representing previously presented image, sound files, or a combination thereof.

The first storage circuit 314 can be a volatile memory, a nonvolatile memory, an internal memory, an external memory, or a combination thereof. For example, the first storage circuit 314 can be a nonvolatile storage such as non-volatile random access memory (NVRAM), Flash memory, disk storage, or a volatile storage such as static random access memory (SRAM).

The first storage circuit 314 can include a first storage interface 324. The first storage interface 324 can be used for communication between the first storage circuit 314 and other functional units or circuits in the first device 102. The first storage interface 324 can also be used for communication that is external to the first device 102.

The first storage interface 324 can receive information from the other functional units/circuits or from external sources, or can transmit information to the other functional units/circuits or to external destinations. The external sources and the external destinations refer to sources and destinations external to the first device 102.

The first storage interface 324 can include different implementations depending on which functional units/circuits or external units/circuits are being interfaced with the first storage circuit 314. The first storage interface 324 can be implemented with technologies and techniques similar to the implementation of the first control interface 322.

The first communication circuit 316 can enable external communication to and from the first device 102. For example, the first communication circuit 316 can permit the first device 102 to communicate with the second device 106 of FIG. 1, an attachment, such as a peripheral device or a desktop computer, and the communication path 104.

The first communication circuit 316 can also function as a communication hub allowing the first device 102 to function as part of the communication path 104 and not limited to be an end point or terminal circuit to the communication path 104. The first communication circuit 316 can include active and passive components, such as microelectronics or an antenna, for interaction with the communication path 104.

The first communication circuit 316 can include a first communication interface 328. The first communication interface 328 can be used for communication between the first communication circuit 316 and other functional units or circuits in the first device 102. The first communication interface 328 can receive information from the other functional units/circuits or can transmit information to the other functional units or circuits.

The first communication interface 328 can include different implementations depending on which functional units or circuits are being interfaced with the first communication circuit 316. The first communication interface 328 can be implemented with technologies and techniques similar to the implementation of the first control interface 322.

The first user interface 318 allows a user (not shown) to interface and interact with the first device 102. The first user interface 318 can include an input device and an output device. Examples of the input device of the first user interface 318 can include a keypad, a touchpad, soft-keys, a keyboard, a microphone, an infrared sensor for receiving remote signals, or any combination thereof to provide data and communication inputs.

The first user interface 318 can include a first display interface 330. The first display interface 330 can include an output device. The first display interface 330 can include a display, a projector, a video screen, a speaker, or any combination thereof.

The first control circuit 312 can operate the first user interface 318 to display information generated by the compute system 100. The first control circuit 312 can also execute the first software 326 for the other functions of the compute system 100, including receiving location information from the first location circuit 320. The first control circuit 312 can further execute the first software 326 for interaction with the communication path 104 via the first communication circuit 316.

The first location circuit 320 can generate location information, current heading, current acceleration, and current speed of the first device 102, as examples. The first location circuit 320 can be implemented in many ways. For example, the first location circuit 320 can function as at least a part of the global positioning system, an inertial vehicle system, a cellular-tower location system, a pressure location system, or any combination thereof. Also, for example, the first location circuit 320 can utilize components such as an accelerometer or global positioning system (GPS) receiver.

The first location circuit 320 can include a first location interface 332. The first location interface 332 can be used for communication between the first location circuit 320 and other functional units or circuits in the first device 102. The first location interface 332 can also be used for communication external to the first device 102.

The first location interface 332 can receive information from the other functional units/circuits or from external sources, or can transmit information to the other functional units/circuits or to external destinations. The external sources and the external destinations refer to sources and destinations external to the first device 102.

The first location interface 332 can include different implementations depending on which functional units/circuits or external units/circuits are being interfaced with the first location circuit 320. The first location interface 332 can be implemented with technologies and techniques similar to the implementation of the first control circuit 312.

The second device 106 can be optimized for implementing an embodiment of the present invention in a multiple device embodiment with the first device 102. The second device 106 can provide the additional or higher performance processing power compared to the first device 102. The second device 106 can include a second control circuit 334, a second communication circuit 336, a second user interface 338, and a second storage circuit 346.

The second user interface 338 allows a user (not shown) to interface and interact with the second device 106. The second user interface 338 can include an input device and an output device. Examples of the input device of the second user interface 338 can include a keypad, a touchpad, softkeys, a keyboard, a microphone, or any combination thereof to provide data and communication inputs. Examples of the output device of the second user interface 338 can include a second display interface 340 of FIG. 3. The second display interface 340 can include a display, a projector, a video screen, a speaker, or any combination thereof.

The second control circuit 334 can execute a second software 342 of FIG. 3 to provide the intelligence of the second device 106 of the compute system 100. The second software 342 can operate in conjunction with the first software 326. The second control circuit 334 can provide additional performance compared to the first control circuit 312.

The second control circuit 334 can operate the second user interface 338 to display information. The second control circuit 334 can also execute the second software 342 for the other functions of the compute system 100, including operating the second communication circuit 336 to communicate with the first device 102 over the communication path 104.

The second control circuit 334 can be implemented in a number of different manners. For example, the second control circuit 334 can be a processor, an embedded processor, a microprocessor, hardware control logic, a hardware finite state machine (FSM), a digital signal processor (DSP), or a combination thereof.

The second control circuit 334 can include a second control interface 344 of FIG. 3. The second control interface 344 can be used for communication between the second control circuit 334 and other functional units or circuits in the second device 106. The second control interface 344 can also be used for communication that is external to the second device 106.

The second control interface 344 can receive information from the other functional units/circuits or from external sources, or can transmit information to the other functional units/circuits or to external destinations. The external sources and the external destinations refer to sources and destinations external to the second device 106.

The second control interface 344 can be implemented in different ways and can include different implementations depending on which functional units/circuits or external units/circuits are being interfaced with the second control interface 344. For example, the second control interface 344 can be implemented with a pressure sensor, an inertial sensor, a microelectromechanical system (MEMS), optical circuitry, waveguides, wireless circuitry, wireline circuitry, or a combination thereof.

A second storage circuit 346 can store the second software 342. The second storage circuit 346 can also store the information such as data representing incoming images, data representing previously presented image, sound files, or a combination thereof. The second storage circuit 346 can be sized to provide the additional storage capacity to supplement the first storage circuit 314.

For illustrative purposes, the second storage circuit 346 is shown as a single element, although it is understood that the second storage circuit 346 can be a distribution of storage elements. Also for illustrative purposes, the compute system 100 is shown with the second storage circuit 346 as a single hierarchy storage system, although it is understood that the compute system 100 can include the second storage circuit 346 in a different configuration. For example, the second storage circuit 346 can be formed with different storage technologies forming a memory hierarchal system including different levels of caching, main memory, rotating media, or off-line storage.

The second storage circuit 346 can be a volatile memory, a nonvolatile memory, an internal memory, an external memory, or a combination thereof. For example, the second storage circuit 346 can be a nonvolatile storage such as non-volatile random access memory (NVRAM), Flash memory, disk storage, or a volatile storage such as static random access memory (SRAM).

The second storage circuit 346 can include a second storage interface 348. The second storage interface 348 can be used for communication between the second storage circuit 346 and other functional units or circuits in the second device 106. The second storage interface 348 can also be used for communication that is external to the second device 106.

The second storage interface 348 can receive information from the other functional units/circuits or from external sources, or can transmit information to the other functional units/circuits or to external destinations. The external sources and the external destinations refer to sources and destinations external to the second device 106.

The second storage interface 348 can include different implementations depending on which functional units/circuits or external units/circuits are being interfaced with the second storage circuit 346. The second storage interface 348 can be implemented with technologies and techniques similar to the implementation of the second control interface 344.

The second communication circuit 336 can enable external communication to and from the second device 106. For example, the second communication circuit 336 can permit the second device 106 to communicate with the first device 102 over the communication path 104.

The second communication circuit 336 can also function as a communication hub allowing the second device 106 to function as part of the communication path 104 and not limited to be an end point or terminal unit or circuit to the communication path 104. The second communication circuit 336 can include active and passive components, such as microelectronics or an antenna, for interaction with the communication path 104.

The second communication circuit 336 can include a second communication interface 350. The second communication interface 350 can be used for communication between the second communication circuit 336 and other functional units or circuits in the second device 106. The second communication interface 350 can receive information from the other functional units/circuits or can transmit information to the other functional units or circuits.

The second communication interface 350 can include different implementations depending on which functional units or circuits are being interfaced with the second communication circuit 336. The second communication interface 350 can be implemented with technologies and techniques similar to the implementation of the second control interface 344.

The first communication circuit 316 can couple with the communication path 104 to send information to the second device 106 in the first device transmission 308. The second device 106 can receive information in the second communication circuit 336 from the first device transmission 308 of the communication path 104.

The second communication circuit 336 can couple with the communication path 104 to send information to the first device 102 in the second device transmission 310. The first device 102 can receive information in the first communication circuit 316 from the second device transmission 310 of the communication path 104. The compute system 100 can be executed by the first control circuit 312, the second control circuit 334, or a combination thereof.

For illustrative purposes, the second device 106 is shown with the partition containing the second user interface 338, the second storage circuit 346, the second control circuit 334, and the second communication circuit 336, although it is understood that the second device 106 can include a different partition. For example, the second software 342 can be partitioned differently such that some or all of its function can be in the second control circuit 334 and the second communication circuit 336. Also, the second device 106 can include other functional units or circuits not shown in FIG. 3 for clarity.

The functional units or circuits in the first device 102 can work individually and independently of the other functional units or circuits. The first device 102 can work individually and independently from the second device 106 and the communication path 104.

The functional units or circuits in the second device 106 can work individually and independently of the other functional units or circuits. The second device 106 can work individually and independently from the first device 102 and the communication path 104.

The functional units or circuits described above can be implemented in hardware. For example, one or more of the functional units or circuits can be implemented using the a gate, circuitry, a processor, a computer, integrated circuit, integrated circuit cores, a pressure sensor, an inertial sensor, a microelectromechanical system (MEMS), a passive device, a physical non-transitory memory medium containing instructions for performing the software function, a portion therein, or a combination thereof.

For illustrative purposes, the compute system 100 is described by operation of the first device 102 and the second device 106. It is understood that the first device 102 and the second device 106 can operate any of the modules and functions of the compute system 100.

Figure 4:
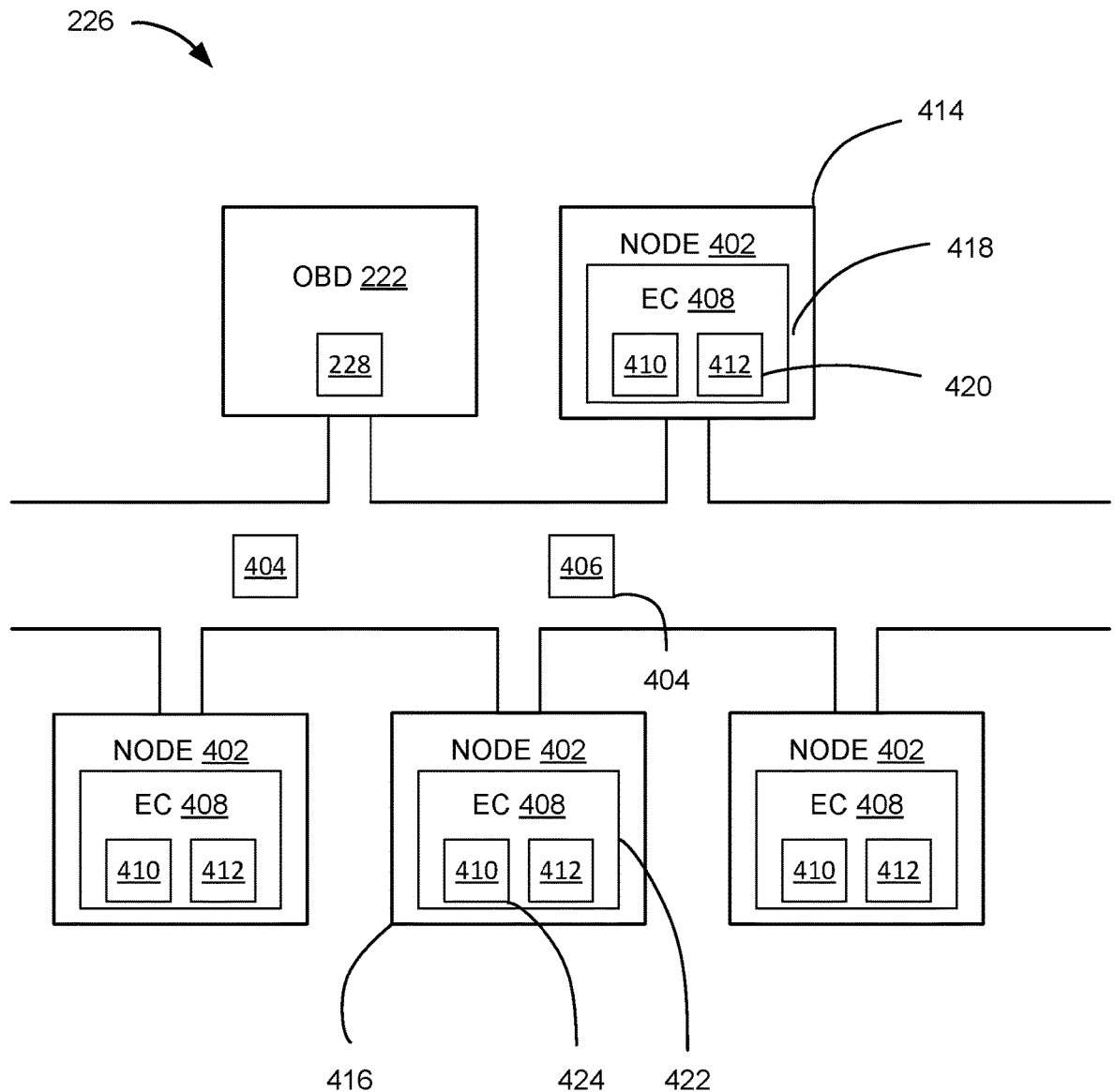
FIG. 4 is an example of a block diagram of a portion of the controller area network within the compute system.

Referring now to FIG. 4, therein is shown an example of a block diagram of a portion of the controller area network 226 of the vehicle 202 in FIG. 2 in the compute system 100 of FIG. 1. The controller area network 226 can include a node 402 and can connect a number of instances of the node 402. Examples of the node 402 can include the vehicle communication circuit 204 of FIG. 2, the vehicle control circuit 206 of FIG. 2, the vehicle storage circuit 208 of FIG. 2, the on-board diagnostics 222, other hardware circuits, or a combination thereof.

The node 402 provides some function for the vehicle 202, such as the electrical systems or subsystems in the vehicle 202. The vehicle 202 can include numerous instances of the node 402 along the controller area network 226. For example, the node 402 can provide function for or relating to the transmission, airbags, antilock braking system, cruise control, power steering, audio systems, doors, battery, or a combination thereof. As a further example, the node 402 can include an on-board diagnostics dongle connected to the on-board diagnostics port 228, which can be connected to the controller area network 226.

The node 402 can interact with the vehicle communication circuit 204, the vehicle control circuit 206, the vehicle storage circuit 208, the on-board diagnostics 222, further instances of the node 402, other devices, or a combination thereof along the controller area network 226. For example, the node 402 can send and receive a message 404 along the controller area network 226.

For brevity and clarity, the description for the controller area network 226 will be described with the node 402 representing any devices connected to the controller area network 226, as examples described earlier. The instances of the node 402 can be similar, same, or different connected to the controller area network 226.

Also for brevity and clarity, the number of instances of the node 402 can include a first node 414 and a second node 416. The designation of the "first" and "second" is for convenience and not intended to describe relative importance. In this example, the first node 414, the second node 416, or a combination thereof can represent different types, similar types, or a combination thereof of the node 402.

For convenience, the first node 414 is described as the node 402 that is transmitting the message 404, unless explicitly stated otherwise. Also, the second node 416 is described as the node 402 that is receiving the message 404, unless explicitly stated otherwise. For clarification, the first node 414 can also function as the node 402 to receive the message 404 and the second node 416 can also function as the node 402 to transmit the message 404.

The message 404 is a packet of data, control commands, or a combination thereof that is transmitted along the controller area network 226. As an example, the message 404 can be transmitted by the first node 414 and received by the second node 416. For example, the message 404 can provide information about the systems or subsystems in the vehicle 202. As examples, the message 404 can include control commands, status information, error information, queries, or a combination thereof.

The message 404 can assist with the operation and function of the controller area network 226. As an example, the message 404 can provide a coordination mechanism from one instance of the node 402 to operate with or control the operation of the controller area network 226, another instance of the node 402, or a combination thereof including the on-board diagnostics 222.

When the second node 416 receives the message 404 and cannot process the message 404, then the second node 416 generates an error 406. Continuing this example, the second node 416 transmits the error 406 as the message 404 as a response over the controller area network 226. The error 406 leads to the removal of the message 404 that caused the error 406 from the controller area network 226. The message 404 including the error 406 from the second node 416 can indicate an incompatibility or a non-operability to the first node 414, other instances of the node 402, or a combination thereof.

Each of the node 402 can detect the error 406. The first node 414 can transmit the message 404 that causes the error 406. The second node 416 can receive the message 404 that causes the error 406. Each of the node 402, whether transmitting or receiving the message 404, can include or be associated with an error counter 408 to track the number of the error 406 detected by the node 402. The error counter 408 records the number of instances of the error 406 detected by the node 402. As an example, the error counter 408 can be implemented with hardware circuits, software, firmware, or a combination thereof. For example, the error counter 408 can include a receive error counter 410 and a transmit error counter 412.

The receive error counter 410 records the number of instances of the error 402 that is received by the node 402, in this example the second node 416 that received the message 404 causing the error 406. For example, the receive error counter 410 can increment a value for the number of instances of the error 406 received by the second node 416 and decrement a value for the number of instances of the message 404 that is successfully processed by the second node 416. For example, the receive error counter 410 can increment a value of 1 for every instance of the error 406 that is received. As a further example, the receive error counter 410 can decrement the value of 1 for every instance of the message 404 that is received and processed or without the error 406 being detected by the second node 416.

The transmit error counter 412 records the number of instances of the error 406 that is transmitted by the node 402 and in this example the first node 414. For example, the transmit error counter 412 can increment a value for the number of instances of the error 406 sent by the first node 414 and decrement a value for the number of instances of the message 404 transmitted by the first node 414. For example, the transmit error counter 412 can increment the value of 7 for every instance of the error 406 is detected in the message 404 sent. As a further example, the transmit error counter 412 can decrement the value of 1 for every instance of the message 404 that is successfully transmitted.

The transmit error counter 412 can increment by a value higher than the receive error counter 410 for every instance of the error 406 detected. The transmit error counter 412 can be configured with the higher value for the detection of the error 406 to prevent further instances of the message 404 being transmitted from generating the error 406 to the other instances of the node 402. The values for the transmit error counter 412 and the receive error counter 410 are assigned to the error counter 408.

Also for brevity and clarity, a first error counter 418 and a first transmit error counter 420 will be described as part of the first node 414. Also for brevity and clarity, a second error counter 422 and a second receive error counter 424 will be described as part of the second node 416. Again, the designation of the "first" and "second" is for convenience and not intended to describe relative importance.

In this example, the first node 414 can transmit the message 404 to the second node 416 along the controller area network 226. The second node 416 can receive the message 404 from the first node 414 along the controller area network 226. The second node 416 can determine whether the message 404 can be processed by the second node 416. If the second node 416 determines that the message 404 from the first node 414 cannot be processed, then the second node 416 generates the error 406 to transmit along the controller area network 226 to the first node 414.

Once the second node 416 transmits the message 404 including the error 406 along the controller area network 226, the second receive error counter 424 can increment a value to record the detection of the error 406 received by the second node 416. For example, the second receive error counter 424 can increase in value by 1 for the error 406 that is transmitted by the second node 416. The value from the second receive error counter 424 can adjust the value of the second error counter 422. For example, the second error counter 422 will increase in value by 1 based on the increase in value by 1 by the second receive error counter 424.

Continuing with this example, the first node 414 can detect the error 406 in the message 404 sent by the first node 414 along the controller area network 226. The first node 414 can record the error 406 in the message 404 utilizing the first transmit error counter 420.

The error 406 detected by the first node 414 can be incremented by the first transmit error counter 420. For example, the first transmit error counter 420 can increase in value by 7 for the message 404 including the error 406 that is transmitted by the first node 414. The value from the first transmit error counter 420 can adjust the value of the first error counter 418. For example, the first error counter 418 will increase in value by 7 based on the increase in value by 7 by the first transmit error counter 420.

Figure 5:
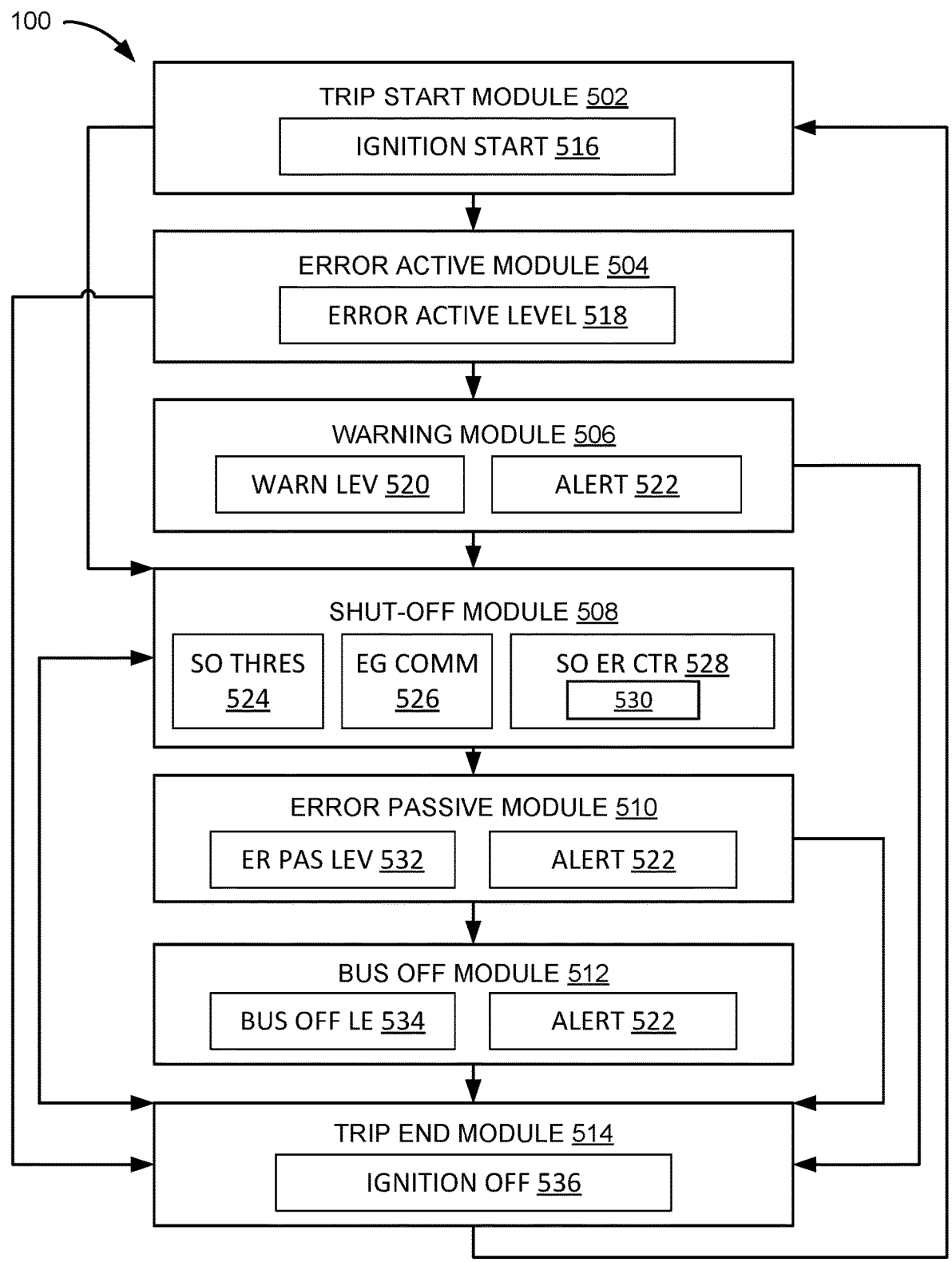
FIG. 5 is an example of a control flow of the compute system.

Referring now to FIG. 5, therein is shown a control flow for the compute system 100. The control flow in FIG. 5 depicts and describes an example of how to prevent anomalies to the vehicle 202 of FIG. 2 by shutting off the on-board diagnostics port 228 of FIG. 2, at least one of the node 402, or a combination thereof connected to the controller area network 226 of FIG. 2.

The compute system 100 can include a trip start module 502, an error active module 504, a warning module 506, a shut-off module 508, an error passive module 510, a bus off module 512, a trip end module 514, or a combination thereof. The aforementioned modules can be included in the first software 326 of FIG. 3, the second software 342 of FIG. 3, or a combination thereof. The first software 326, the second software 342, or a combination thereof can be executed with the first control circuit 312 of FIG. 3, the second control circuit 334 of FIG. 3, the vehicle control circuit 206 of FIG. 2, or a combination thereof.

In the example shown in FIG. 5, the trip start module 502 can be coupled to the error active module 504. The error active module 504 can be coupled to the warning module 506 and the trip end module 514. The warning module 506 can be coupled to the shut-off module 508 and the trip end module 514. The shut-off module 508 can be coupled to the error passive module 510 and the trip end module 514. The error passive module 510 can be coupled to the bus off module 512 and the trip end module 514. The bus off module 512 can be coupled to the trip end module 514. The trip end module 514 can be coupled to the trip start module 502 and the shut-off module 508.

The modules can be coupled using wired or wireless connections, by including an output of one module as an input of the other module, by including operations of one module influence operation of the other module, or a combination thereof. The module can be directly coupled with no intervening structures or objects other than the connector there-between, or indirectly coupled.

The trip start module 502 is configured to detect an ignition start 516 for the vehicle 202. The ignition start 516 is when the ignition status 224 of FIG. 2 of the vehicle 202 is in the on position. For example, the trip start module 502 is configured to receive the ignition status 224. As described earlier, the ignition status 224 can be provided from the on-board diagnostics 222, the node 402 of FIG. 4, or a combination thereof.

The trip start module 502 can reset the error counter 408 of FIG. 4, the receive error counter 410 of FIG. 4, the transmit error counter 412 of FIG. 4, or a combination thereof of the node 402 of FIG. 4 based on the detection of the ignition start 516. For example, the trip start module 502 can reset the first error counter 418 of FIG. 4, the first transmit error counter 420 of FIG. 4, the second error counter 422 of FIG. 4, the second receive error counter 424 of FIG. 4, or a combination thereof.

The trip start module 502 can receive the on-board diagnostics 222 with one or more communication circuits, such as the first communication circuit 316, the second communication circuit 336, the vehicle communication circuit 204, or a combination thereof. The trip start module 502 can reset the error counter 408 of the node 402 operating one or more control circuits, such as the first control circuit 312, the second control circuit 334, the vehicle control circuit 206, or a combination thereof.

The trip start module 502 can retrieve information from the shut-off module 508 to determine the ignition start 516 of the vehicle 202. The trip start module 502 can detect if the shut-off module 508 has reached a permanent threshold 530. If the trip start module 502 detects that the shut-off module 508 has reached the permanent threshold 530, then the trip start module 502 can prevent the operation of the vehicle 202 until the on-board diagnostics port 228 is reset or re-enabled.

If the trip start module 502 does not detect that the shut-off module 508 has reached the permanent threshold 530, the flow can progress to the error active module 504 to determine the number of instances of the error 406 along the controller area network 226 of FIG. 2.

The error active module 504 is configured to determine if the node 402, the controller area network 226, or a combination thereof is operating at an error active level 518 or normal operation. The error active level 518 is when the node 402 detects instances of the error 406 but does not interrupt communication along the controller area network 226. For example, the error active level 518 can be when the value of error counter 408, the receive error counter 410, the transmit error counter 412, or a combination thereof is greater than 0 and less than 96.

The error active level 518 is detected by receiving the value of the error counter 408 of the node 402 along the controller area network 226. For example, the error active module 504 can receive the value of the first error counter 418, the second error counter 422, the error counter 408 of further instances of the node 402, or a combination thereof. The error active module 504 can allow interaction between the controller area network 226 and the on-board diagnostics port 228 when the node 402 is operating at the error active level 518.

The error active module 504 can receive the value of the error counter 408 of the node 402 with one or more communication circuits, such as the first communication circuit 316, the second communication circuit 336, the vehicle communication circuit 204, or a combination thereof. The error active module 504 can allow interaction between the controller area network 226, the on-board diagnostics port 228 operating one or more control circuits, such as the first control circuit 312, the second control circuit 334, the vehicle control circuit 206, or a combination thereof.

The flow can progress to the warning module 506 when the value of the error counter 408 of the node 402 exceeds the error active level 518. The flow can also progress to the trip end module 514 when the value of the error counter 408 of the node 402 does not exceed the error active level 518.

The warning module 506 is configured to detect if the node 402 is operating at a warning level 520. The warning level 520 is when the node 402 detects instances of the error 406 that begins to interrupt communication along the controller area network 226. For example, the warning level 520 can be when the value of the error counter 408, the receive error counter 410, the transmit error counter 412, or a combination thereof is greater than 95 and less than 128.

The warning level 520 is detected by receiving the value of the error counter 408 of the node 402 along the controller area network 226. For example, the warning module 506 can receive the value of the first error counter 418, the second error counter 422, the error counter 408 of further instances of the node 402, or a combination thereof. The warning module 506 can generate an alert 522 to the compute system 100.

The alert 522 is a notification that indicates the interruptions to the communication along the controller area network 226. For example, the alert 522 can be a visual notification that is displayed on the first display interface 330 of FIG. 3, the second display interface 340 of FIG. 3, or a combination thereof. As a further example, the alert 522 can be an audio notification that is transmitted by the first user interface 318 of FIG. 3, the second user interface 338 of FIG. 3, or a combination thereof.

The warning module 506 can receive the value of the error counter 408 of the node 402 with one or more communication circuits, such as the first communication circuit 316, the second communication circuit 336, the vehicle communication circuit 204, or a combination thereof. The warning module 506 can generate the alert 522 operating one or more control circuits, such as the first control circuit 312, the second control circuit 334, the vehicle control circuit 206, or a combination thereof.

The flow can progress to the shut-off module 508 to determine whether the on-board diagnostics port 228 should be shut-off from the controller area network 226. The flow can also progress to the trip end module 514 when the value of the error counter 408 of the node 402 does not exceed the warning level 520.

The shut-off module 508 is configured to detect if the node 402 has reached a shut-off threshold 524. The shut-off threshold 524 is when the error counter 408 of the node 402 reaches beyond the upper limit of the warning level 520. For example, the shut-off threshold 524 can be when the value of the error counter 408 of the node 402 reaches 127.

The shut-off threshold 524 is determined by receiving the value of the error counter 408 of the node 402 along the controller area network 226. For example, the shut-off module 508 can receive the value of the first error counter 418, the second error counter 422, the error counter 408 of further instances of the node 402, or a combination thereof. The shut-off module 508 can shut-off the on-board diagnostics port 228 temporarily when the error counter 408, the receive error counter 410, the transmit error counter 412, or a combination thereof has reached the shut-off threshold 524.

The term "temporarily" refers to the inability of the on-board diagnostics port 228 to interact with the controller area network 226 based on the ignition status 224 of the vehicle 202. For example, the shutting off of the on-board diagnostics port 228 temporarily can be while the ignition status 224 of the vehicle 202 is on. As a further example, the on-board diagnostics port 228 that is shut-off temporarily can resume interaction with the controller area network 226 of the vehicle 202 upon detection of the ignition start 516 by the trip start module 502, in other words, turning the engine off then turning the engine back on.

The shut-off module 508 can be configured to shut-off the on-board diagnostics port 228 automatically. For example, the shut-off module 508 can trigger the shut-off of the on-board diagnostics port 228 without further action by the vehicle 202. The shut-off module 508 can also shut-off the on-board diagnostics port 228 with an egress command 526.

The egress command 526 provides control information for the interaction of the on-board diagnostics port 228 with the controller area network 226. For example, the egress command 526 can be transmitted by the first device 102 of FIG. 1, the second device 106 of FIG. 1, an external entity, or a combination thereof to shut-off the on-board diagnostics port 228 of the vehicle 202. The egress command 526 can be received by the first communication circuit 316, the second communication circuit 336, the vehicle communication circuit 204, the node 402, or a combination thereof to shut-off the on-board diagnostics port 228 to prevent interaction with the controller area network 226 of the vehicle 202.

The shut-off module 508 can also include a shut-off error frame counter 528. The shut-off error frame counter 528 records the number any instance of the node 402 has reached the shut-off threshold 524 after the ignition start 516. For example, the shut-off error frame counter 528 can increment by 1 when the shut-off module 508 detects that the node 402 has reached the shut-off threshold 524 after the ignition start 516. As a further example, the shut-off error frame counter 528 can decrement by 1 when the error counter 408 of the node 402 is reset without reaching the shut-off threshold 524.

In this example the shut-off error frame counter 528 is not reset by the trip start module 502 upon detection of the ignition start 516. For example, the value of the shut-off error frame counter 528 persists and does not reset based on the ignition status 224 of the vehicle 202.

The shut-off module 508 can shut-off the on-board diagnostics port 228 permanently once the shut-off error frame counter 528 reaches the permanent threshold 530. The permanent threshold 530 is when the on-board diagnostics port 228 has been shut-off repeatedly after the ignition start 516. For example, the permanent threshold 530 can be when the value of the shut-off error frame counter 528 reaches a value of 3.

The term "permanently" refers to the inability of the on-board diagnostics port 228 to interact with the controller area network 226 of the vehicle 202. The shutting off of the on-board diagnostics port 228 permanently can require that the on-board diagnostics port 228 be reset or re-enabled. The on-board diagnostics port 228 can be reset manually by physically removing a device connected to the on-board diagnostics port 228. For example, the on-board diagnostics port 228 can be reset by removing and reconnecting an on-board diagnostics dongle.

The on-board diagnostics port 228 can also be re-enabled utilizing the egress command 526. For example, the egress command 526 can transmitted from an external entity to the compute system 100, the vehicle 202, or a combination thereof. The egress command 526 can be received by the first communication circuit 316, the second communication circuit 336, the vehicle communication circuit 204, the node 402, or a combination thereof to re-enable the on-board diagnostics port 228 to allow interaction with the controller area network 226 of the vehicle 202.

The shut-off module 508 can prevent the vehicle 202 from turning on or allowing operation while the on-board diagnostics port 228 is permanently shut-off. For example, the shut-off module 508 can prevent the ignition status 224 from turning on unless the on-board diagnostics port 228 is reset. As a further example, the shut-off module 508 can prevent the ignition status 224 from turning on until the on-board diagnostics port 228 is re-enabled with the egress command 526.

The shut-off module 508 can receive the value of the error counter 408 of the node 402 with one or more communication circuits, such as the first communication circuit 316, the second communication circuit 336, the vehicle communication circuit 204, or a combination thereof. The shut-off module 508 can transmit the egress command 526 with one or more communication circuits, such as a first communication circuit 316, the second communication circuit 336, the vehicle communication circuit 204, or a combination thereof. The shut-off module 508 can shut-off the on-board diagnostics port 228 with one or more control circuits, such as the first control circuit 312, the second control circuit 334, the vehicle control circuit 206, or a combination thereof.

When the compute system 100 does not include the shut-off module 508, the flow can progress to the error passive module 510 to determine if the node 402 has begun to ignore the error 406 along the controller area network 226. The error passive module 510 is an example of the flow when the compute system 100 does not include the shut-off module 508. The flow can also progress to the trip end module 514 if the shut-off module 508 shuts off the on-board diagnostics port 228.

The error passive module 510 is configured to detect if the node 402 is operating at an error passive level 532. The error passive level 532 is when the instances of the error 406 are ignored by the node 402 along the controller area network 226. For example, the error passive level 532 can be when the value of the error counter 408, the receive error counter 410, the transmit error counter 412, or a combination thereof of the node 402 is greater than 127 and less than 256.

The error passive level 532 is determined by receiving the value of the error counter 408 of the node 402 along the controller area network 226. For example, the error passive module 510 can receive the value of the first error counter 418, the second error counter 422, the error counter 408 of additional instances of the node 402, or a combination thereof. The error passive module 510 can generate the alert 522 to the compute system 100, the vehicle 202, or a combination thereof when the error passive level 523 is detected.

The error passive module 510 can receive the value of the error counter 408 of the node 402 with one or more communication circuits, such as the first communication circuit 316, the second communication circuit 336, the vehicle communication circuit 204, or a combination thereof. The error passive module 510 can generate the alert 522 operating one or more control circuits, such as the first control circuit 312, the second control circuit 334, the vehicle control circuit 206, or a combination thereof.

The flow can progress to the bus off module 512 to determine if the node 402 has stopped transmitting the message 404 along the controller area network 226. The bus off module 512 is also optional and an example of the flow when the compute system 100 does not include the shut-off module 508. The flow can also progress to the trip end module 514 if the node 402 is not operating at the error passive level 532.

The bus off module 512 is configured to detect if the node 402 is operating at a bus off level 534. The bus off level 534 is when the node 402 stops transmitting the message 404 along the controller area network 226. For example, the bus off level 534 can be when the value of the error counter 408, the receive error counter 410, the transmit error counter 412, or a combination thereof is greater than 255.

The bus off level 534 is determined by receiving the value of the error counter 408 of the node 402 along the controller area network 226. For example, the bus off module 512 can receive the value of the first error counter 418, the second error counter 422, the error counter 408 of additional instances of the node 402, or a combination thereof. The bus off module 512 can generate the alert 522 to the compute system 100, the vehicle 202, or a combination thereof when the bus off level 534 is detected.

The bus off module 512 can receive the value of the error counter 408 of the node 402 with one or more communication circuits, such as the first communication circuit 316, the second communication circuit 336, the vehicle communication circuit 204, or a combination thereof. The bus off module 512 can generate the alert 522 operating one or more control circuits, such as the first control circuit 312, the second control circuit 334, the vehicle control circuit 206, or a combination thereof.

The flow can progress to the trip end module 514 to determine if the vehicle 202 has stopped operating.

The trip end module 514 is configured to detect an ignition off 536 for the vehicle 202 of the compute system 100. The ignition off 536 is when the ignition status 224 of the vehicle 202 is in the off position. For example, the trip end module 514 is configured to receive the ignition status 224. As described earlier, the ignition status 224 can be provided from the on-board diagnostics 222.

When the trip end module 514 detects the ignition off 536, the trip end module 514 can provide information to the shut-off module 508 to decrement the shut-off error frame counter 528 when the on-board diagnostics port 228 is not temporarily shut-off before the ignition off 536 is detected. For example, the trip end module 514 can provide output to the shut-off module 58 to decrement the shut-off error frame counter 528 by a value of 1.

The trip end module 514 can receive the on-board diagnostics 222 with one or more communication circuits, such as the first communication circuit 316, the second communication circuit 336, the vehicle communication circuit 204, or a combination thereof. The trip start module 514 provide output to the shut-off module 508 operating one or more control circuits, such as the first control circuit 312, the second control circuit 334, the vehicle control circuit 206, or a combination thereof.

The flow can progress to the trip start module 502 to detect the ignition start 516 of the vehicle 202 of the compute system 100.

It has been discovered that the embodiments improve the function of the compute system 100, the vehicle 202, or a combination thereof by preventing anomalies and functional problems to the vehicle 202 when the node 402 operates at the error passive level 532, the bus off level 534, or a combination thereof. For example, the node 402 can to interfere with the interactions of the vehicle communication circuit 204, the vehicle control circuit 206, the vehicle storage circuit 208, the on-board diagnostics 222, other instances of the node 402, other interfaces, or a combination thereof along the controller area network 226.

It has been yet further discovered that the compute system 100 improves the accuracy and performance for detecting the anomalies caused by an external device that is plugged into the on-board diagnostics port 228. For example, the compute system 100 can determine that an on-board diagnostics dongle is causing interruptions along the controller area network 226. As a further example, the compute system 100 can determine that the on-board diagnostics dongle is causing the alarm of the vehicle 202 to turn on improperly.

It has been yet further discovered that the compute system 100 improves the performance of the vehicle 202 by preventing safety hazards when the node 402 interferes with the interactions of the vehicle communication circuit 204, the vehicle control circuit 206, the vehicle storage circuit 208, the on-board diagnostics 222, other instances of the node 402, other interfaces, or a combination thereof along the controller area network 226. For example, the interference with the interactions along the controller area network 226 can cause the vehicle 202 to disable the ability to control the transmission. The inability to control the transmission can cause the vehicle 202 to shift into a gear that causes the vehicle 202 to abruptly stall or go limp. As a further example, the interference with the interactions along the controller area network 226 can cause the ignition to turn off while the vehicle 202 is in operation.

It has been yet further discovered that the embodiments improve the function of the compute system 100, the vehicle 202, or a combination thereof by minimizing anomalies by shutting off the on-board diagnostics port 228 when the error counter 408, the receive error counter 410, the transmit error counter 412, or a combination thereof reaches the shut-off threshold 524. For example, the compute system 100 can minimize further damage to the compute system 100, the vehicle 202, or a combination thereof by shutting off the on-board diagnostics port 228. As a further example, the compute system 100, the vehicle 202, or a combination thereof can prevent drainage of the battery 230 by shutting off the on-board diagnostics port 228.

It has been yet further discovered that the compute system 100, the vehicle 202, or a combination thereof can minimize the risk of injury and damage by permanently shutting off the on-board diagnostics port 228 when the shut-off error frame counter 528 reaches the permanent threshold 530. Permanently shutting off the on-board diagnostics port 228 can prevent the use of the compute system 100, the vehicle 202, or a combination thereof before anomalies arise while the vehicle 202 is in operation It has been yet further discovered that the simplified and robust determination to shut-off the on-board diagnostics port 228 allows the compute system 100, the vehicle 202, or a combination thereof to provide accurate on-board diagnostics 222. As an example, the compute system 100, the vehicle 202, or a combination thereof can determine the cause of the anomalies. The anomalies can be caused by hardware issues, firmware issues, incompatibility issues, malfunctioning issues, or a combination thereof.

The modules described in this application can be hardware implementation or hardware accelerators, including passive circuitry, active circuitry, or both, in the first storage circuit 314, the second storage circuit 346, the first control circuit 312, the second control circuit 334, or a combination thereof. The module can also be hardware implementation or hardware accelerators, including passive circuitry, active circuitry, or both, within the first device 102, the second device 106, or a combination thereof but outside of the first storage circuit 314, the second storage circuit 346, the first control circuit 312, the second control circuit 334, or a combination thereof.

The compute system 100 has been described with module functions or order as an example. The compute system 100 can partition the modules differently or order the modules differently. For example, the compute system 100 can be without the error passive module 510, the bus off module 512, or a combination thereof.

For illustrative purposes, the various modules have been described as being specific to the first device 102, the second device 106, or the vehicle 202. However, it is understood that the modules can be distributed differently. For example, the various modules can be implemented in a different device, or the functionalities of the modules can be distributed across multiple devices. Also as an example, the various modules can be stored in a non-transitory memory medium.

As a more specific example, one or more modules described above can be stored in the non-transitory memory medium for distribution to a different system, a different device, a different user, or a combination thereof, for manufacturing, or a combination thereof. Also as a more specific example, the modules described above can be implemented or stored using a single hardware unit or circuit, such as a chip or a processor, or across multiple hardware units or circuits.

The modules described in this application can be stored in the non-transitory computer readable medium. The first storage circuit 314, the second storage circuit 346, or a combination thereof can represent the non-transitory computer readable medium. The first storage circuit 314, the second storage circuit 346, the vehicle storage circuit 208, or a combination thereof, or a portion therein can be removable from the first device 102, the second device 106, the vehicle 202, or a combination thereof. Examples of the non-transitory computer readable medium can be a non-volatile memory card or stick, an external hard disk drive, a tape cassette, or an optical disk.

The physical transformation of the error counter 408, the receive error counter 410, the transmit error counter 412, or a combination thereof representing the real-world environment results in the real-time movement in the physical world, such as physical change in information or environment processed for the user on one or more of the devices or physical displacement of the vehicle 202. Movement in the physical world results in updates to the vehicle 202 which can be fed back into the compute system 100 and further influence operation or update the vehicle 202.

Figure 6:
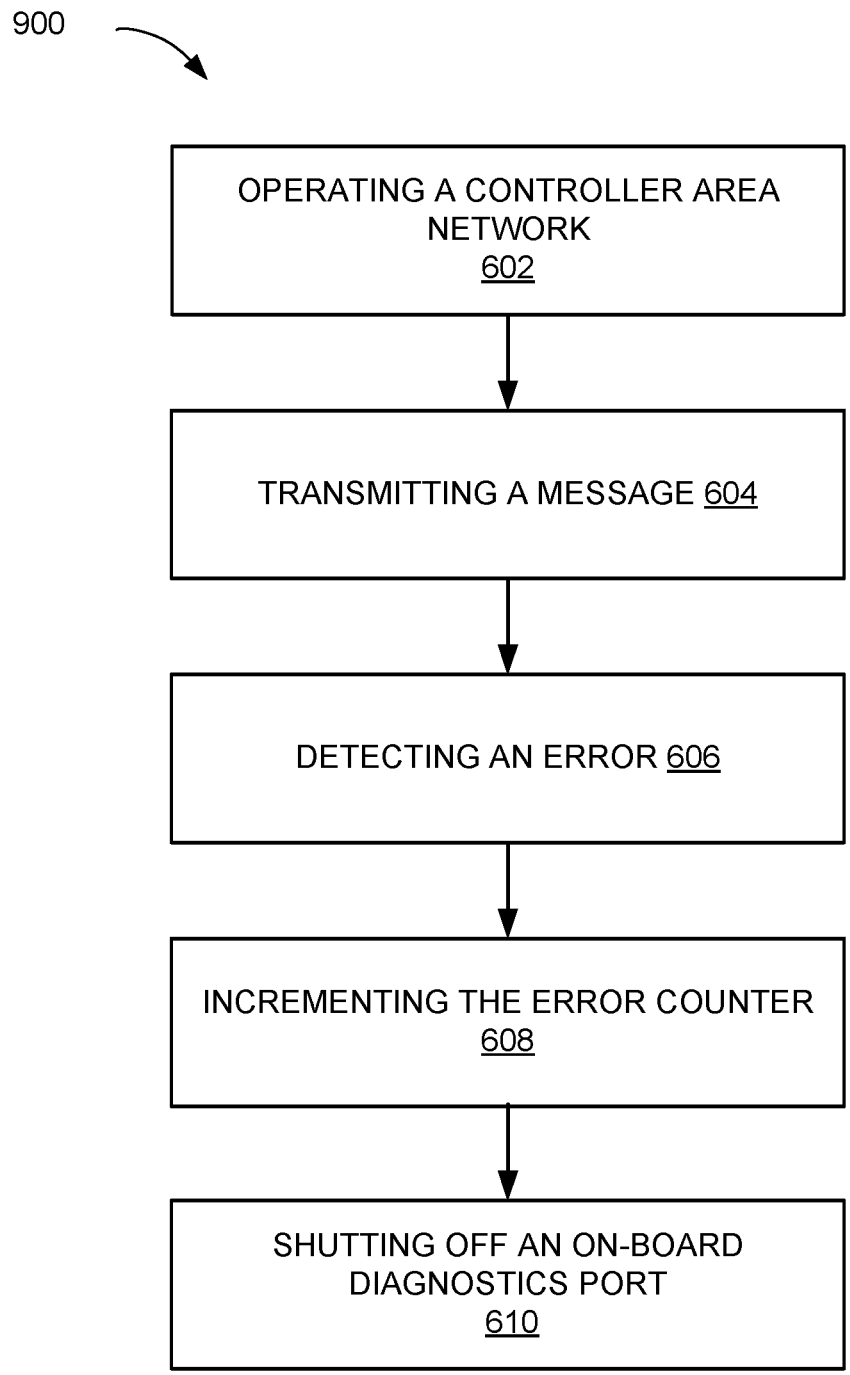
FIG. 6 is a flow chart of a method of operation of a compute system in an embodiment of the present invention.

Referring now to FIG. 6, therein is shown a flow chart of a method 600 of operation of a compute system 100 in an embodiment of the present invention. The method 600 includes: operating a controller area network with a first node including a first error counter and a second node including a second error counter in a box 602; transmitting a message from the first node to the second node over the controller area network in a box 604; detecting an error by the first node or the second node in a box 606; incrementing the first error counter or the second error counter based on whichever the first node or the second node detected the error in a box 608; and shutting off an on-board diagnostics port when the first error counter or the second error counter reaches a shut-off threshold in a box 610.

As an example, the method 600 further includes wherein detecting the error includes detecting the error by the first node; incrementing the first error counter includes incrementing the first transmit error counter of the first error counter; and shutting-off the on-board diagnostics portion when the first error counter includes shutting off the on-board diagnostics port temporarily when the first transmit error counter reaches the shut-off threshold. Further as an example, the method 600 includes wherein detecting the error includes detecting the error by the second node; incrementing the second error counter includes incrementing a second receive error counter of the second error counter; and shutting off the on-board diagnostics port when the second error counter includes shutting off the on-board diagnostics port temporarily when the second receive error counter reaches the shut-off threshold.

Also as an example, the method 600 includes wherein shutting off the on-board diagnostics port includes shutting off the on-board diagnostics port with an egress command. Also as an example, the method 600 includes wherein shutting off the on-board diagnostics port includes shutting off the on-board diagnostics port temporarily; further comprising: incrementing a shut-off error frame counter when the on-board diagnostics port is temporarily shut-off; and shutting off the on-board diagnostics port permanently when the shut-off error frame counter reaches a permanent threshold.

Yet further as an example, the method 600 includes resetting the first error counter, the second error counter, or a combination thereof when an ignition start is detected; incrementing a shut-off error frame counter when the on-board diagnostics port is temporarily shut-off; and shutting off the on-board diagnostics port permanently when the shut-off error frame counter reaches a permanent threshold.

Still further as an example, the method 600 includes resetting the first error counter, the second error counter, or a combination thereof when an ignition start is detected; decrementing a shut-off error frame counter when the on-board diagnostics port is not temporarily shut-off and when an ignition off is detected.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A method of operation for a compute system comprising:
   operating a controller area network with a first node including a first error counter and a second node including a second error counter;
   transmitting a message from the first node to the second node over the controller area network;
   detecting an error by the first node or the second node;

incrementing the first error counter or the second error counter based on whichever the first node or the second node detected the error; and shutting off an on-board diagnostics port when the first error counter or the second error counter reaches a shut-off threshold including incrementing a shut-off error frame counter when the on-board diagnostics port is temporarily shut off and shutting off the on-board diagnostics port permanently when the shut-off error frame counter reaches a permanent threshold.

2. The method as claimed in claim 1 wherein:

detecting the error includes detecting the error by the first node;

incrementing the first error counter includes incrementing a first transmit error counter of the first error counter; and shutting off the on-board diagnostics port when the first error counter includes shutting off the on-board diagnostics port temporarily when the first transmit error counter reaches the shut-off threshold.

3. The method as claimed in claim 1 wherein:

detecting the error includes detecting the error by the second node;

incrementing the second error counter includes incrementing a second receive error counter of the second error counter; and shutting off the on-board diagnostics port when the second error counter includes shutting off the on-board diagnostics port temporarily when the second receive error counter reaches the shut-off threshold.

4. The method as claimed in claim 1 wherein shutting off the on-board diagnostics port includes shutting off the on-board diagnostics port with an egress command.

5. The method as claimed in claim 1 further comprising:

resetting the first error counter, the second error counter, or a combination thereof when an ignition start is detected;

incrementing a shut-off error frame counter when the on-board diagnostics port is temporarily shut-off; and shutting off the on-board diagnostics port permanently when the shut-off error frame counter reaches a permanent threshold.

6. The method as claimed in claim 1 further comprising:

resetting the first error counter, the second error counter, or a combination thereof when an ignition start is detected;

decrementing a shut-off error frame counter when the on-board diagnostics port is not temporarily shut-off and when an ignition off is detected.

7. A compute system comprising:

a communication circuit configured to:
operate a controller area network with a first node including a first error counter and a second node including a second error counter,
transmit a message from the first node to the second node over the controller area network;

a control circuit, coupled to the communication circuit, configured to:
detect an error by the first node or the second node,
increment the first error counter or the second error counter based on whichever the first node or the second node that detected the error, and
shut-off an on-board diagnostics port when the first error counter or the second error counter reaches a shut-off threshold includes incrementing a shut-off error frame counter when the on-board diagnostics port is temporarily shut off and shutting off the on-board diagnostics port permanently when the shut-off error frame counter reaches a permanent threshold.

8. The system as claimed in claim 7 wherein the control circuit is further configured to:
detect the error by the first node;
increment a first transmit error counter of the first error counter; and
shut-off the on-board diagnostics port temporarily when the first transmit error counter reaches the shut-off threshold.

9. The system as claimed in claim 7 wherein the control circuit is further configured to:
detect the error by the second node;
increment a second receive error counter of the second error counter; and
shut-off the on-board diagnostics port temporarily when the second receive error counter reaches the shut-off threshold.

10. The system as claimed in claim 7 wherein the control circuit is further configured to shut-off the on-board diagnostics port with an egress command.

11. The system as claimed in claim 7 wherein the control circuit is further configured to:
resetting the first error counter, the second error counter, or a combination thereof when an ignition start is detected;
increment a shut-off error frame counter when the on-board diagnostic port is temporarily shut-off; and
shut-off the on-board diagnostics port permanently when the shut-off error frame counter reaches a permanent threshold.

12. The system as claimed in claim 7 wherein the control circuit is further configured to:
resetting the first error counter, the second error counter, or a combination thereof when at an ignition start is detected; and
decrement a shut-off error frame counter when the on-board diagnostic port is temporarily shut-off and when an ignition off is detected.

13. A non-transitory computer readable medium including instructions executable by a control circuit for a compute system comprising:
operating a controller area network with a first node including a first error counter and a second node including a second error counter;
transmitting a message from the first node to the second node over the controller area network;
detecting an error by the first node or the second node;
incrementing the first error counter or the second error counter based on whichever the first node or the second node that detected the error; and
shutting off an on-board diagnostics port when the first error counter or the second error counter reaches a shut-off threshold including incrementing a shut-off error frame counter when the on-board diagnostics port is temporarily shut off and shutting off the on-board diagnostics port permanently when the shut-off error frame counter reaches a permanent threshold.

14. The non-transitory computer readable medium as claimed in claim 13 further comprising:
detecting the error includes detecting the error by the first node;
incrementing the first error counter includes incrementing a first transmit error counter of the first error counter; and shutting off the on-board diagnostics port when the first error counter includes shutting off the on-board diagnostics port temporarily when the first transmit error counter reaches the shut-off threshold.

15. The non-transitory computer readable medium as claimed in claim 13 further comprising:
    detecting the error includes detecting the error by the second node;
    incrementing the second error counter includes incrementing a second receive error counter of the second error counter; and
    shutting off the on-board diagnostics port when the second error counter includes shutting off the on-board diagnostics port temporarily when the second receive error counter reaches the shut-off threshold.

16. The non-transitory computer readable medium as claimed in claim 13 further comprising shutting off the on-board diagnostics port including shutting off the on-board diagnostics port with an egress command.

17. The non-transitory computer readable medium as claimed in claim 13 further comprising:
    resetting the first error counter, the second error counter, or a combination thereof when an ignition start is detected;
    incrementing a shut-off error frame counter when the on-board diagnostic port is temporarily shut-off; and
    shutting off the on-board diagnostics permanently when the shut-off error frame reaches a permanent threshold.

* * * * *